United States Patent Office 3,350,956
Patented Nov. 7, 1967

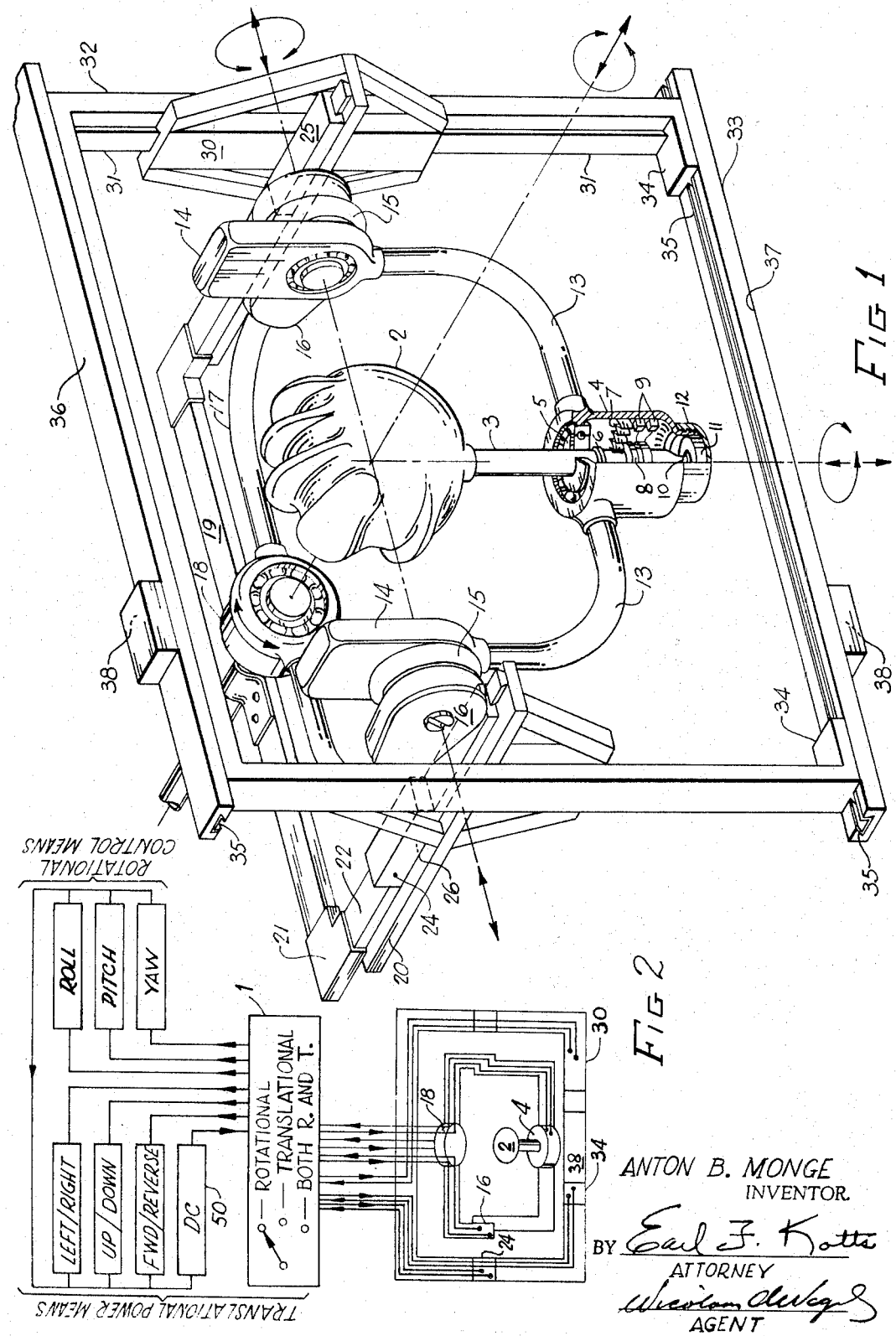

3,350,956
SIX-DEGREE OF FREEDOM INTEGRATED
CONTROLLER
Anton Barton Monge, Garden Grove, Calif., assignor to
General Dynamics Corporation, San Diego, Calif., a
corporation of Delaware
Filed July 6, 1965, Ser. No. 469,464
16 Claims. (Cl. 74—471)

This invention relates to control devices, and more particularly, it relates to a handle for controlling the attitude of a vehicle moving through a fluid medium. The disclosed invention presents a hand operated control device, with freedom of both; rotational movement about three axes and translational movement along the same three axes, which will afford complete control of a vehicle with one hand. The axes origin meets in a common point substantially at the center of the hand grip and appropriate gimbals rotatably mount shafts, common to these axes such that said hand grip may be manually rotated about any of the axes. Furthermore the hand grip is mounted in a nest of three sliding frames which afford translational movement of the system along each of the axes.

In the past, control of a flight vehicle has been achieved by a three axes control device normally in combination with pedal control for the feet.

A disadvantage of the prior systems is that in a high acceleration environment their use is not satisfactory, because the movements of a pilot are highly restricted and the control of a vehicle must be attained with a minimum of movements on the part of the pilot or astronaut. Another disadvantage of the existing systems is that the control devices normally require a certain force and take prohibitive weight which especially in regard to space vehicles is undesirable and expensive.

It is therefore an object of this invention to provide a hand control device which allows six-degrees of freedom.

Another object of this invention is to provide a manual control which allows the pilot to move his vehicle in any combination of six-degree of freedom by the use of one hand.

It is still another object of this invention to provide a vehicle motion control device which can be operated by the use of one hand thereby controlling the overall vehicle motion parameters.

It is an important object of this invention to provide a one hand operating control device permitting speed and direction control of the vehicle thereby allowing freedom to the other limbs of the operator for the performance of other functions.

It is a further object of this invention to provide a control device which obtains yaw control without concentrated thought or muscle control.

It is an additional object of the present invention to provide a six-degree of freedom handle for manual control of vehicle moving through a fluid medium and furnishes the pilot with an intuitive control over his vehicle.

The above and other novel features of the invention will appear more fully hereinafter from the following detailed description and taken into conjunction with the accompanying drawings in which:

FIGURE 1 illustrates a perspective view of the six-degree of freedom control device.

FIGURE 2 shows schematically the electrical layout of the control device.

In general the invention comprises a control grip or handle which is mounted in a set of gimbals. The gimbals are arranged and positioned in such a way as to allow the control grip's rotation about three orthogonal axes. The origin of the axes of rotation of the gimbals is positioned coincident with the center point of the control grip or handle. Each of the gimbals are spring loaded for automatic return to a neutral position and detents are provided at the neutral position so that het operator acquires a "feel" when maneuvering the hand grip in rotation about each of the three orthogonal axes.

A first frame, a second frame a third frame slidably mounted with one another in a nested arrangement so that each frame allows motion along one axis coincident with one of said three gimbal orthogonal axes.

The plurality of gimbals with the control grip are mounted within said nest of frames. Each of the sliding frames is provided with spring means and detents so that return of the frame to a neutral position in coordination with a detent provided at that neutral point will provide "feel" to the operator. Electrical means are mounted and connected with each of said sliding frames and each of said gimbals for translation of signals to the associated vehicle control and power-means.

Vehicle motion in attitude is commanded by turning the ball grip in the direction the vehicle is to rotate. Vehicle motion in translation is commanded by pushing the ball grip in the direction the vehicle is to move.

Referring now to the drawings wherein like reference characters indicate like parts there is illustrated in FIGURE 1, in perspective fashion, the preferred embodiment of a six-degree freedom control handle for vehicles. The controller ball 2, provided with finger indentications in order to give support to the one hand operation manipulations, is affixed to the yaw axis shaft 3. This shaft 3 is mounted in bearings in the yaw axis mounting block 4 and is positioned by a shaft collar 5 on the top and a retaining ring 6 beneath. A return spring 7 is attached to the mounting block 4 and the shaft collar 5. An "on-off" actuator 8 is also attached to the shaft collar 5 and operates the pair of micro-switches 9 fastened to the inside of the mounting block 4. The detent collar 5 and spring 7 are attached to the shaft 3 below the retaining ring 6. The shaft has been machined to a screwdriver tip 10 at this end. This tip 10 is used to operate a potentiometer 11 which is fastened to the outside of the mounting block 4 by means of the potentiometer mounting bracket 12.

The pitch axes radius arms 13 are inserted in the sides of the yaw axis mounting block 4 and on the other sides are mounted the pitch axis counterweight 14, held in position by spacers 15. The two pitch axis shafts 13 are inserted into the pitch axis blocks 16 and the same various mechanisms are mounted to the pitch axis mounting blocks, in the same manner, as to the yaw axis mounting block 4. For instance, outside on the left side are two microswitches, an on-off actuator, and a return spring, and outside on the right side are a detent and a potentiometer, however it should be understood that there are various ways of assembling the signal control means and spring detent bias means and this particular way as described should not limit this invention to its novelty.

The roll axis radius arms 17 are inserted into the outer pitch axis mounting block 16, and sweep away from the operator's position to the roll axis gimbal mounting block 18. The roll axis shaft 17 is inserted in this block 18 and is mounted in bearings in the gimbal block 18. The actuating and spring mechanism are mounted to the shaft 17 and inside the gimbal block 18 as was done for the yaw axis shaft 3 and block 4.

The gimbal block 18 is attached to the gimbal support beam 19, which transfers motion to the support slides 20. Corner braces 21 are used to attach the support beam to the horizontal slide 22. The slides 22 pass through Teflon slide bearings, and are fastened to a translation control mounting plate 24 on the left side and a translation idler plate 25 on the right side. Under the control plate 24, the following components 26 are fastened (not shown in FIGURE 1), a switch actuator bar, a pair of return springs on each side of an indentation means, microswitches, to be operated by the switch actuator bar and an elongated potentiometer means. Thus, a substantial identical combination of components 26 is provided for the same purpose and arranged substantially in the same manner as shown in yaw block 4. A pair of return springs are mounted on the idler plate 25 in the same fashion as on the control plate 24, so that a balanced biased tension is provided. The vertical slides 30 pass through the Teflon slide bearings 31 which are attached to the frame members 32. On these members 32 an identical mechanism (not shown) is mounted for control signals to the power means of the vehicle. The lateral slides 33 are attached to the vertical slides by means of corner braces 34 and pass through the final sets of slide bearings 35. These bearings are mounted on the final control and idler plates 36 and 37, with the control plate 36 on top and idler plate 37 on the bottom. Mechanical assemblies 38 (not shown) identical to the previous slide assemblies as on control plate 24 and vertical slide 30, are attached to these plates 36 and 37.

Referring to FIGURE 2, a diagrammatic plan view is illustrated wherein a supply voltage 50 is fed into the controller 1 and signals of varied potential, depending on the position of the controller ball 2 affecting a change of voltage potential in one or more of the potentiometers, will activate the vehicle to move into the desired attitude.

As shown in the diagram the blocks indicated are the control circuit and power means associated therewith which the up and down, left to right, forward and reverse circuits which are part of the power means of the spacecraft. Also shown in FIGURE 2 there is indicated in the blocks the various rotational movements such as yaw, pitch and roll.

The gimbal means and frame means are aligned so that the origin of the axes system is located at the center of the controller ball 2. This arrangement allows fewer rotations to be imparted to the ball 2 by the fingers without cross-coupling between the axes. Neutral positions are demarked by detents in each of the axis in the rotational as well as translational directions. The control signals for the vehicle attitude will be furnished by potentiometers mounted on the gimbal axis as shown by the similar devices mounted on the sliding frames. The gimbal mechanism is inherently balanced in two axes and the third axis will be counter-balanced so that accelerations of the vehicle will not cause torques in any of the rotation axes.

In short, this device combines into one instrument control overall vehicle motion parameters. It allows start of vehicle motion through the use of one hand, freeing the other limbs for the performance of other functions.

It should be understood that the preferred embodiment is as shown herein but that the system could be controlled by various other systems such as pneumatic or mechanical configurations, which however, should not limit the inventive and novel spirit of this device.

Although various miner structural modifications might be suggested to the preferred embodiment herein described by way of illustrative example only, it should be understood that changes could be effected to the illustrated structures herein described without departing from the spirit of the present invention and, accordingly, it should be further understood that the inventor wishes to enclose within the scope of the patent warranted hereon all such modifications as reasonably and properly come within the scope of the inventor's contribution to the art.

What is claimed is:

1. A six-degree freedom control grip for a vehicle moving through a fluid medium comprising in combination:
   (a) a control grip rotationally mounted to gimbal means;
   (b) frame means having frame members slidably mounted with one another along three orthogonal axes;
   (c) separate gimbal means rotatably mounted on said frame means and positioned within said frame members coincident along said orthogonal axes and having the same origin;
   (d) said control grip being rotatably movable along each of said orthogonal axes and being linearly movable along each of said orthogonal axes.

2. A six-degree freedom control grip for a vehicle moving through a fluid medium as claimed in claim 1 wherein said control grip comprises a control ball for one hand operation manipulations and wherein said origin is coincident with said control ball center point.

3. A six-degree freedom control grip for a vehicle moving through a fluid medium comprising in combination:
   (a) a set of gimbals arranged and positioned for rotation about three orthogonal axes;
   (b) a control grip mounted to said gimbal arrangement;
   (c) said set of gimbals mounted on a frame means;
   (d) said three orthogonal axes having its origin coincident with said control grip center;
   (e) said frames comprising a first frame, a second frame and a third frame slidably mounted with one another in a nested arrangement so that each frame allows motion along one of said axes and said frame positioned coincident with said three orthogonal axes of said set of gimbals.

4. A six-degree freedom control grip for a vehicle comprising in combination:
   (a) a control grip rotationally mounted on gimbal means;
   (b) said gimbal means rotationally mounted on a frame means;
   (c) said frame means having frames slidably mounted along three orthogonal axes; and
   (d) said gimbal means positioned within said frame means for rotation along said three orthogonal axes and having the same origin.

5. The device as claimed in claim 4 wherein said gimbal means is provided with detents and spring means for determining a neutral position.

6. The device as claimed in claim 4 wherein said frame means is provided with spring means and detents so that a neutral position is provided for each of said frames.

7. The device as claimed in claim 4 wherein said gimbal means is provided with detents and spring means for determining a neutral position; and
   said frame means is provided with spring means and detents so that a neutral position is provided for each of said frames.

8. A control device for attitude control to a vehicle in all directions, comprising in combination:
   (a) a control handle mounted on a gimbal means;
   (b) said gimbal means adapted for rotation about a yaw axis, pitch axis and roll axis by activation of said control handle;
   (c) said gimbal means mounted on a frame arrangement for translational movement along each of said axes, by activation of said control handle; and
   (d) means connected to said gimbal means and said frame arrangement for translating rotational and translational movements activated by said control handle to associated control and power means of said vehicle.

9. The device as claimed in claim 8 wherein said means connected to said gimbal means and said frame arrangement is provided with a position control switching means for individual control of said rotational, said translational and both said rotational and translational movements to said associated control and power means of said vehicle.

10. The device as claimed in claim 8 wherein said frame means and said gimbal means is provided with spring biased detent means for neutral positioning along and about each of said yaw, pitch and roll axes.

11. A control device for attitude control to a vehicle in all directions comprising in combination:
(a) a control handle mounted for rotation in all directions on a gimbal means;
(b) said gimbal means adapted for rotation about a yaw axis, pitch axis, and roll axis of said vehicle;
(c) said gimbal means comprising a plurality of bearing means connected with a plurality of shaft means and means connecting said control handle rotationally to said gimbal means and rotationally on a frame means;
(d) said frame means provided with three frames arranged for translational movement along each of said axis by activation of said control handle;
(e) said frame means provided with bearing means for slidable movement of said frames;
(f) means connected to said gimbal means and said frame means for translating the rotational and translational movements activated by said control handle to said attitude control of said vehicle; and
(g) said gimbal means, said frame means and said control handle being mounted for movable activation along and about said same yaw, pitch and roll axes having a common origin.

12. The device as claimed in claim 11 wherein means are provide for returning said handle into a neutral position along and about each of said axes of rotational and translational movement respectively, and wherein said means comprises detents and resilient means mounted on said gimbal and said frame means.

13. A control handle for steering and accelerating a vehicle in all directions, comprising in combination:
(a) a control handle mounted for rotation about a first axis on a first bearing means;
(b) said first bearing means mounted on a second bearing means for rotation of said first bearing and said control handle about a second axis substantially perpendicular with said first axis;
(c) said second bearing means mounted on a third bearing means for rotation of said first bearing means, second bearing means and said control handle about a third axis substantially perpendicular with said first and said second axes;
(d) said frame means having a first, second and third frame each slidably mounted along said first axis, second axis and third axis respectively;
(e) said third bearing means fixedly mounted on said first frame for transmitting translational movement of said first bearing means, second bearing means, third bearing means and control handle to said frame means.

14. The apparatus as claimed in claim 13 wherein said origin of said first, second and third axes is coincident with said frame means and said first, second and third bearing means.

15. The apparatus as claimed in claim 14 wherein each said bearing means and each of said frame means is provided with signal control means, switching means and resilient neutral positioning means.

16. The apparatus as claimed in claim 15 wherein a position control means is mounted with the output of said signal control means and said switching means for individual control of said control handle in respect of said rotational, said translational and both said rotational and translational movements thereof and resulting activation to said associated steering and acceleration of said vehicle.

References Cited

UNITED STATES PATENTS 2,986,361  5/1961  Codding _____ 244—83 X

MILTON KAUFMAN, *Primary Examiner.*